US012042049B2

(12) United States Patent
Chung

(10) Patent No.: US 12,042,049 B2
(45) Date of Patent: Jul. 23, 2024

(54) FOLDABLE BED ASSEMBLY

(71) Applicant: ULIFE HEALTHCARE INC., Taoyuan (TW)

(72) Inventor: Ya-Hsin Chung, Taichung (TW)

(73) Assignee: ULIFE HEALTHCARE INC., Taoyuan (TW)

( * ) Notice: Subject to any disclaimer, the term of this patent is extended or adjusted under 35 U.S.C. 154(b) by 9 days.

(21) Appl. No.: 17/510,507

(22) Filed: Oct. 26, 2021

(65) Prior Publication Data

US 2023/0050413 A1 Feb. 16, 2023

(30) Foreign Application Priority Data

Aug. 12, 2021 (TW) ................................ 110209506

(51) Int. Cl.

*A47C 19/12* (2006.01)
*A47C 17/70* (2006.01)
*A47C 19/00* (2006.01)
*A47C 20/12* (2006.01)
*A61G 7/002* (2006.01)

(52) U.S. Cl.

CPC ............ *A47C 19/122* (2013.01); *A47C 17/70* (2013.01); *A47C 19/00* (2013.01); *A47C 19/12* (2013.01); *A47C 19/124* (2013.01); *A47C 19/126* (2013.01); *A47C 20/12* (2013.01); *A61G 7/002* (2013.01)

(58) Field of Classification Search

CPC ..... A47C 19/12; A47C 19/122; A47C 19/126; A47C 21/006; A47C 17/70; A61H 23/0254; A61H 23/0263; A61H 2023/0272; A61H 2023/0281; A61H 2023/029; A61H 23/04; A61H 2201/0165; Y10S 5/933; A61G 7/002; A61G 7/005; A61G 7/015; A61G 7/018

See application file for complete search history.

(56) References Cited

U.S. PATENT DOCUMENTS

2017/0013968 A1* 1/2017 Bartelsmeyer ......... A47C 19/12
2019/0343292 A1* 11/2019 Porter .................... A47C 17/58
2020/0178695 A1* 6/2020 Shih ..................... A47C 20/041
2020/0214460 A1* 7/2020 Wang .................. A47C 21/006

FOREIGN PATENT DOCUMENTS

CN 109259500 A * 1/2019 ............. A47C 1/024
GB 2549337 A * 10/2017 ........... A47C 19/025
KR 200175209 Y1 * 3/2000 ............. A47C 19/12

* cited by examiner

*Primary Examiner* — David R Hare
*Assistant Examiner* — Deborah Talitha Gedeon
(74) *Attorney, Agent, or Firm* — ALLEN, DYER, DOPPELT, + GILCHRIST, P.A.

(57) ABSTRACT

A foldable bed assembly includes first and second frame units and two hinge units. The first frame unit includes two first longitudinal frames, and a first transverse frame. The second frame unit includes two second longitudinal frames and a second transverse frame. The second frame unit is pivotable relative to the first frame unit and convertible between a normal state, where the first transverse frame is spaced apart from the second transverse frame, and a folded state, where the second longitudinal frames are respectively overlaid on the first longitudinal frames and the first transverse frame is overlaid on the second transverse frame.

9 Claims, 10 Drawing Sheets

FOLDABLE BED ASSEMBLY

CROSS-REFERENCE TO RELATED APPLICATION

This application claims priority of Taiwanese Utility Model Application No. 110209506, filed on Aug. 12, 2021.

FIELD

The disclosure relates to a bed assembly, more particularly to a foldable bed assembly.

BACKGROUND

Because it is complicated to assemble components of a conventional bed such as a bed frame, bed legs and a bed panel, the conventional bed is usually assembled in advance in the factory before transportation to a user's place. However, the assembled conventional bed is bulky, occupies a relatively large space in a truck and more manpower and freight are required to transport the conventional bed. Although the components of conventional bed may be transported to the user's place and then be assembled by a technician, the number of components of the conventional bed is quite a lot and the components may be missing during transportation and the procedure of assembling the conventional bed is complicated and time consuming.

SUMMARY

Therefore, an object of the disclosure is to provide a foldable bed assembly that can alleviate at least the drawback of the prior art.

According to an aspect of the disclosure, a foldable bed assembly includes a first frame unit, a second frame unit, and two hinge units. The first frame unit includes two first longitudinal frames and a first transverse frame. The first longitudinal frames extend along a longitudinal direction and each of the first longitudinal frames has an inner end portion and an outer end portion. The first transverse frame extends along a transverse direction transverse to the longitudinal direction and interconnects the outer end portions or the first longitudinal frames. The second frame unit includes two second longitudinal frames and a second transverse frame. The second longitudinal frames extend along the longitudinal direction and each of the second longitudinal frames has an inner end portion adjacent to a respective one of the inner end portions of the first longitudinal frames and an outer end portion. The second transverse frame extends along the transverse direction and interconnects the outer end portions of the second longitudinal frames. The hinge units pivotally interconnect the first frame unit and the second frame unit. Each of the hinge units is disposed between a respective one of the inner end portions of the first longitudinal frames and a corresponding one of the inner end portions of the second longitudinal frames and includes a hinge member. The hinge member of each of the hinge units includes two interconnecting walls spaced apart from each other along the transverse direction and a base wall interconnecting the interconnecting walls. Each of the interconnecting walls includes a first hinge portion pivotally connected to a corresponding one of the inner end portions of the first longitudinal frames and a second hinge portion pivotally connected to the corresponding one of the inner end portions of the second longitudinal frames. The second frame unit is pivotable relative to the first frame unit and is convertible between a normal state, where the first transverse frame is spaced apart from the second transverse frame along the longitudinal direction, and a folded state, where the second longitudinal frames are respectively overlaid on the first longitudinal frames and the first transverse frame is overlaid on the second transverse frame.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
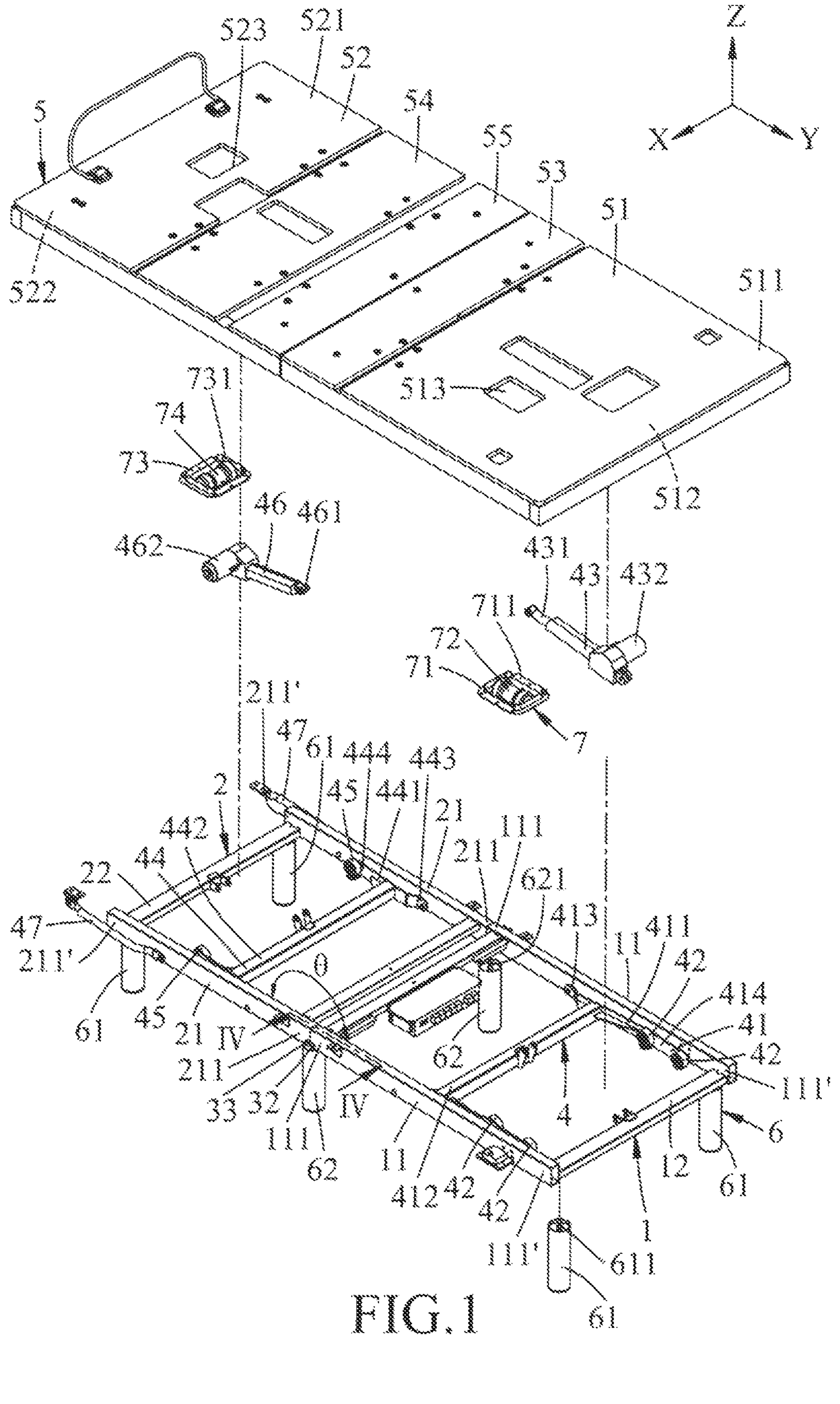
FIG. 1 is a partly exploded perspective view of an embodiment of the foldable bed assembly according to the present disclosure.
Figure 2:
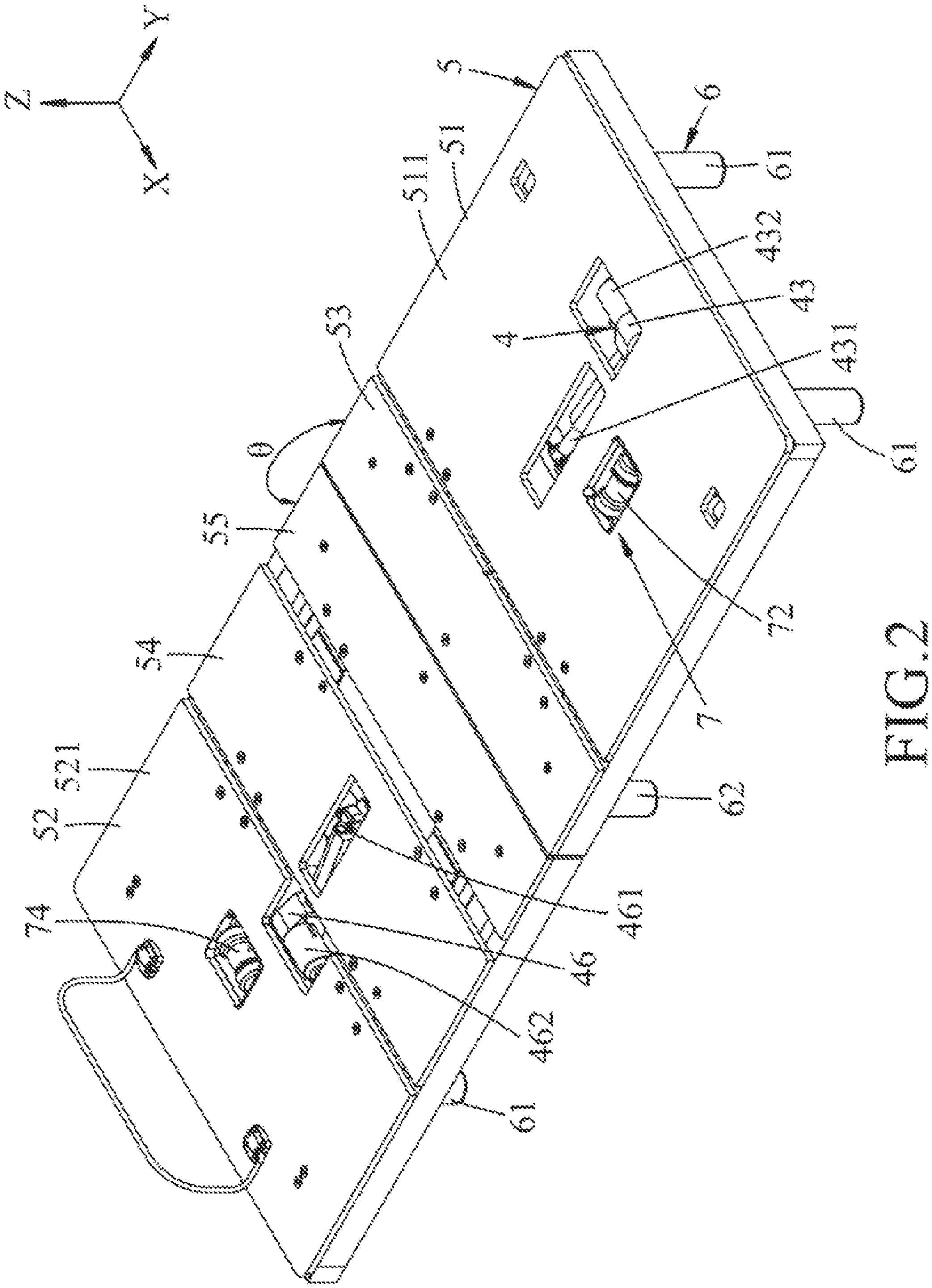
FIG. 2 is a perspective view of embodiment, illustrating the foldable bed assembly being in a normal state.
Figure 3:
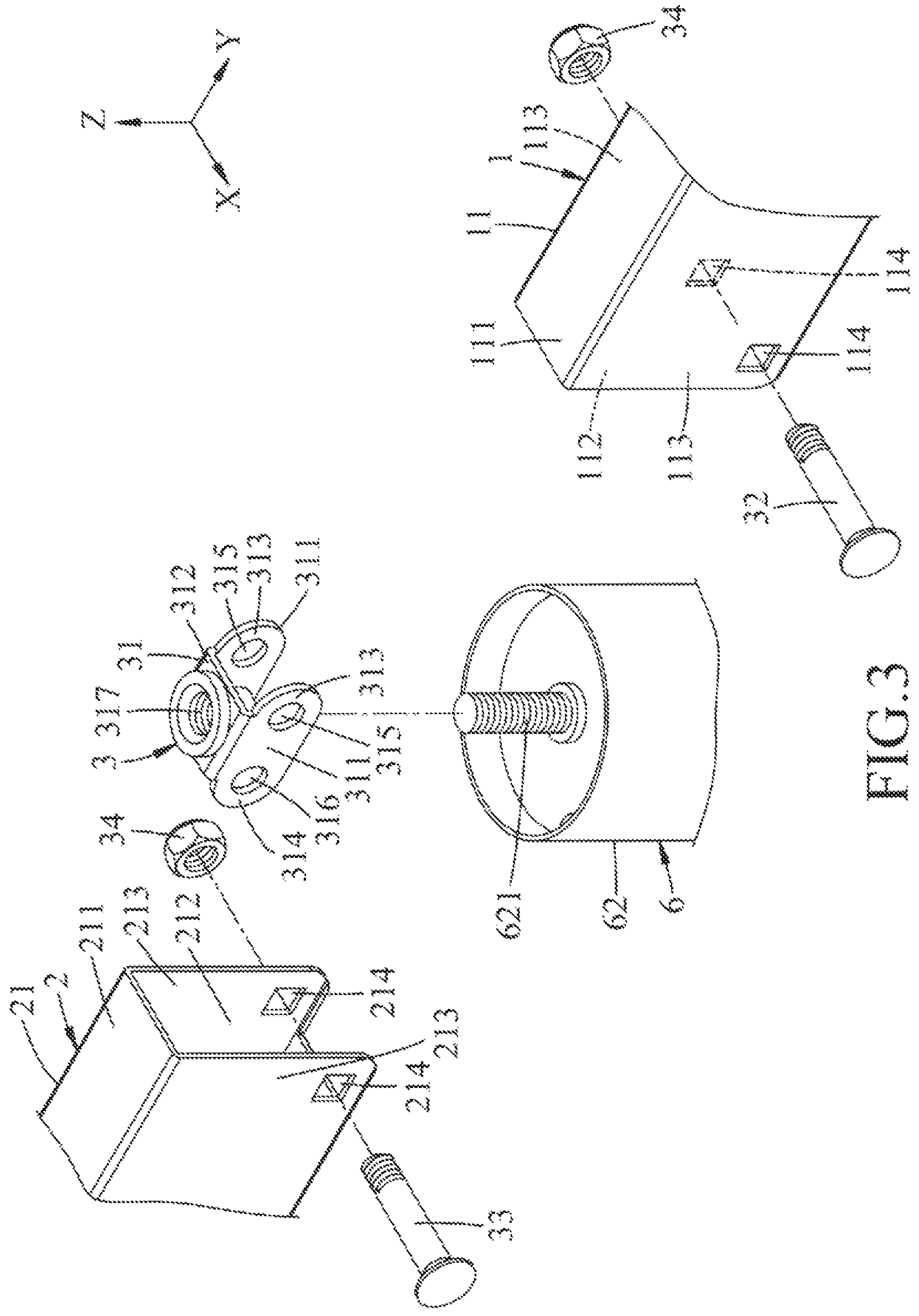
FIG. 3 is a fragmentary exploded perspective view of a portion of the bed assembly.

Referring to FIGS. 1 to 3, an embodiment of a foldable bed assembly according to the present disclosure includes a first frame unit 1, a second frame unit 2, two hinge units 3 (only one is shown in FIG. 3), a jack unit 4, a bed panel unit 5, a leg unit 6 and a vibrating unit 7.

The first frame unit 1 includes two first longitudinal frames 11 and a first transverse frame 12. The first longitudinal frames 11 extend along a longitudinal direction (Y) and each of the first longitudinal frames 11 has an inner end portion 111 and an outer end portion 111'. The first transverse frame 12 extends along a transverse direction (X) transverse to the longitudinal direction (Y) and interconnects the outer end portions 111' of the first longitudinal frames 11.

The inner end portion 111 of each of the first longitudinal frames 11 includes two first pivot connecting walls 133 extending along the longitudinal direction (Y) and defining a first receiving groove 112 therebetween. In this embodiment, two square first pivot holes 114 are formed respectively in the first pivot connecting walls 113 of the inner end portion 111 of each of the first longitudinal frames 11.

The second frame unit 2 includes two second longitudinal frames 21 and a second transverse frame 22. The second longitudinal frames 21 extend along the longitudinal direction (Y) and each of which has an inner end portion 211 adjacent to a respective one of the inner end portions 121 of the first longitudinal frames 11 and an outer end portion 211'. The second transverse frame 22 extends along the transverse direction (X) and interconnects the outer end portions of 211' the second longitudinal frames 21. The inner end portion 211 of each of the second longitudinal frames 21 includes two second pivot connecting walls 213 extending along the longitudinal direction (Y) and defining a second receiving groove 212 therebetween. In this embodiment, two square first pivot holes 214 are formed respectively in the second pivot connecting walls 213 of the inner end portion 211 of each of the second longitudinal frames 21.

In this embodiment, each of the first and second longitudinal frames 11, 21 is integrally formed by aluminum extrusion to reduce manufacturing cost. In other embodiments, the first and second longitudinal frames 11, 21 may be made from four solid cylinders that are formed respectively with the first and second receiving grooves 112, 212.

Figure 4:
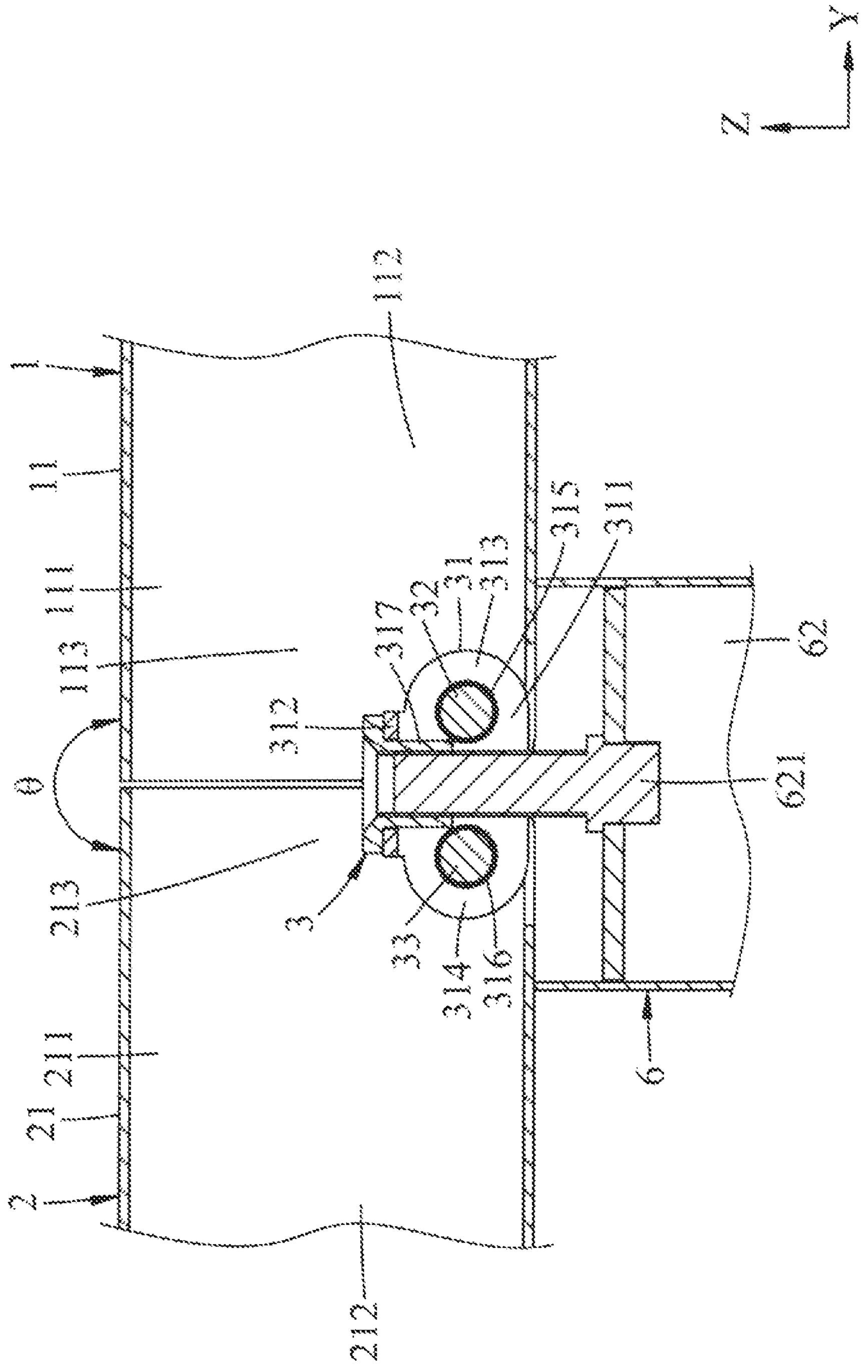
FIG. 4 is a sectional view taken along line IV-IV in FIG. 1.

Further referring to FIG. 4, the hinge units 3 pivotally interconnect the first frame unit 1 and the second frame unit 2. Each of the hinge units 3 is disposed between a respective one of the inner end portions 111 of the first longitudinal frames 11 and a corresponding one of the inner end portions 211 of the second longitudinal frames 21. Each of the hinge units 3 includes a hinge member 31, a first bolt 32, a second bolt 33, and two nuts 34. The hinge member 31 of each of the hinge units 3 is disposed in the first receiving groove 112 of a corresponding one of the first longitudinal frames 11 and the second receiving groove 212 of a corresponding one of the second longitudinal frames 21. Specifically, each of the hinge members 31 includes two interconnecting walls 311 spaced apart from each other along the transverse direction (X) and a base wall 312 interconnecting the interconnecting walls 311. Each of the interconnecting walls 311 includes a first hinge portion 313 pivotally connected to a corresponding one of the inner end portions 111 of the first longitudinal frames 11 and a second hinge portion 314 pivotally connected to the corresponding one of the inner end portions 211 of the second longitudinal frames 21. The first hinge portion 313 and the second hinge portion 314 of each of the interconnecting walls 311 are respectively formed with first and second pivot holes 315, 316 and the base wall 312 is formed with a threaded hole 317.

Figure 8:
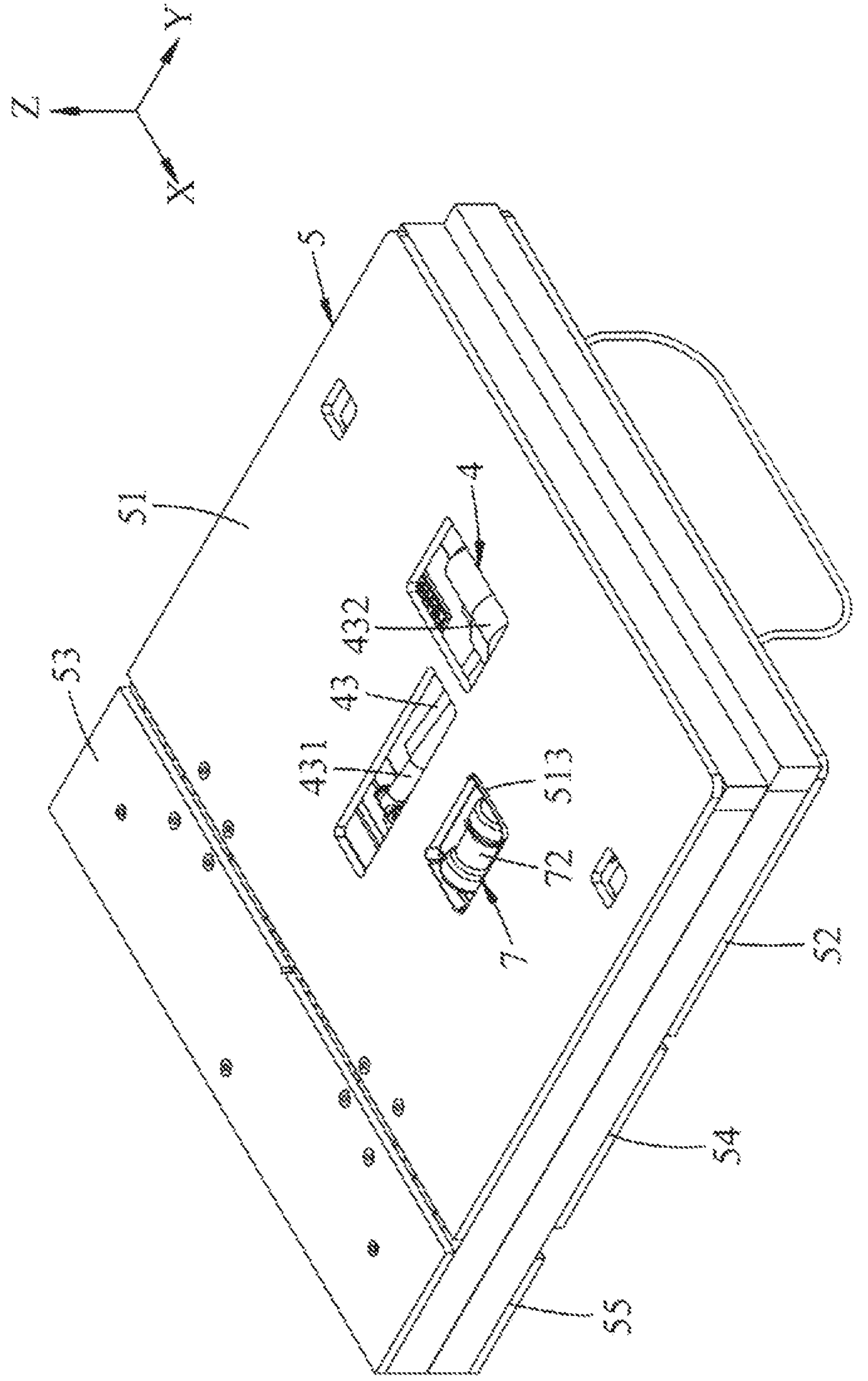
FIG. 8 is a perspective view of the embodiment, illustrating the foldable bed assembly being in a folded state.

The second frame unit 2 is pivotable relative to the first frame unit 1 and is convertible between a normal state (see FIG. 2), where the first transverse frame 12 is spaced apart from the second transverse frame 22 along the longitudinal direction (Y), and a folded state (see FIG. 8), where the second longitudinal frames 22 are respectively overlaid on the first longitudinal frames 11 and the first transverse frame 12 is overlaid on the second transverse frame 22. In this way, the first and second frame units 1, 2 define an included angle (θ) therebetween ranging from 0 degree to 180 degrees. In this embodiment, the included angle (θ) equals to 0 degree when the second frame unit 2 is in the folded state and equals to 180 degrees when the second frame unit 2 is in the normal state.

The first bolt 32 of each of the hinge units 3 extends through the first pivot holes 114 of a corresponding one of the inner end portions 111 of the first longitudinal frames 11 and the first pivot holes 315 of the interconnecting walls 311 of a corresponding one of the hinge members 31, and threadedly engages a respective one of the nuts 34. The second bolt 33 of each of the hinge units 3 extends through the second pivot holes 214 of a corresponding one of the inner end portions 211 of the second longitudinal frames 21 and the second pivot holes 316 of the interconnecting walls 311 of a corresponding one of the hinge members 31, and threadedly engages a respective one of the nuts 34, so that the first longitudinal frames 11 are respectively and pivotally connected to the second longitudinal frames 12. It should be noted that, the first and second pivot holes 114, 214 are square In this embodiment and may be circular or configured to have a shape complementary to the first and second bolts 32, 33.

Figure 5:
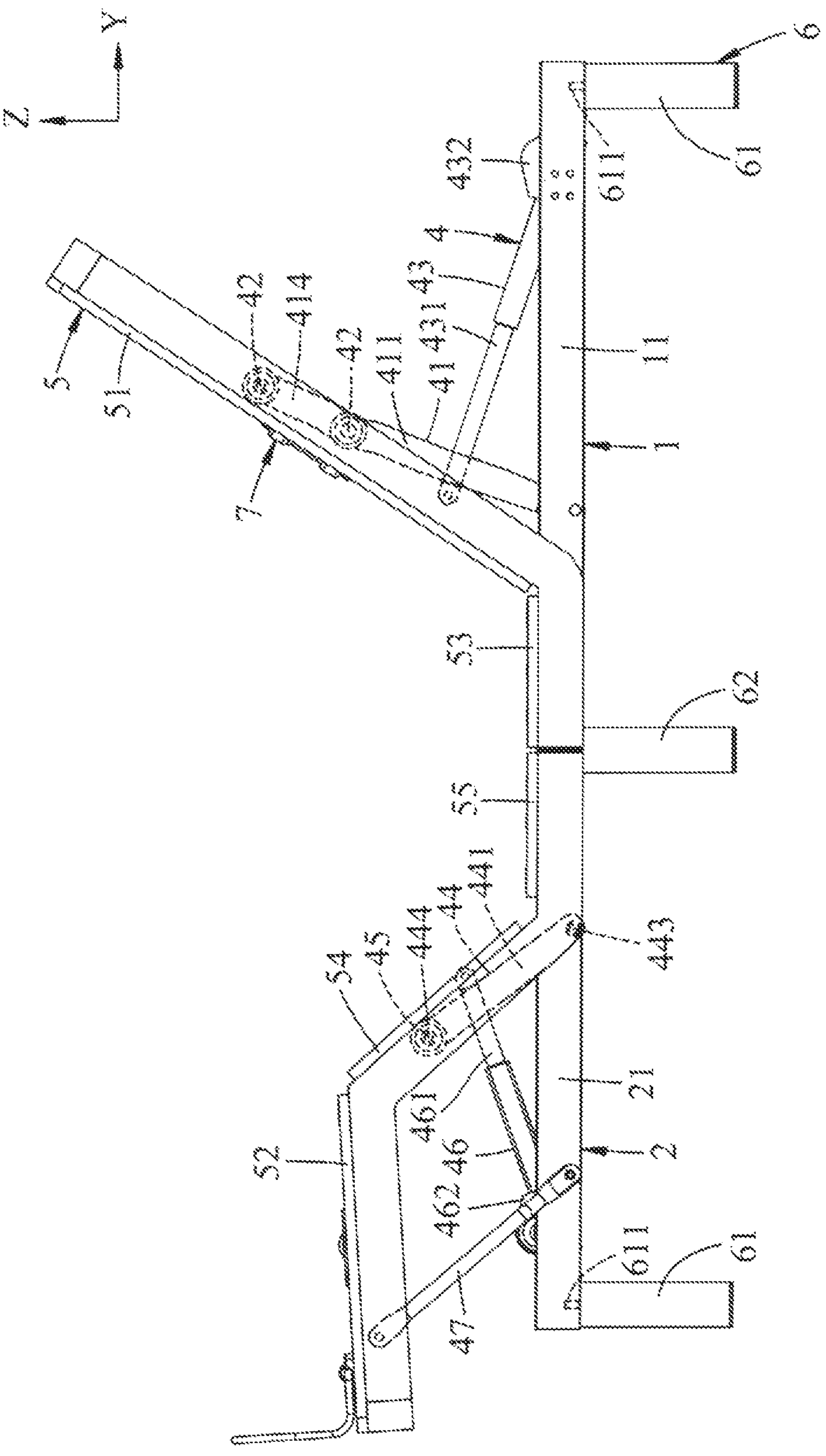
FIG. 5 is a schematic elevational view of the embodiment, illustrating first, second and auxiliary panels being driven by a jack unit to move to an elevated state.
Figure 6:
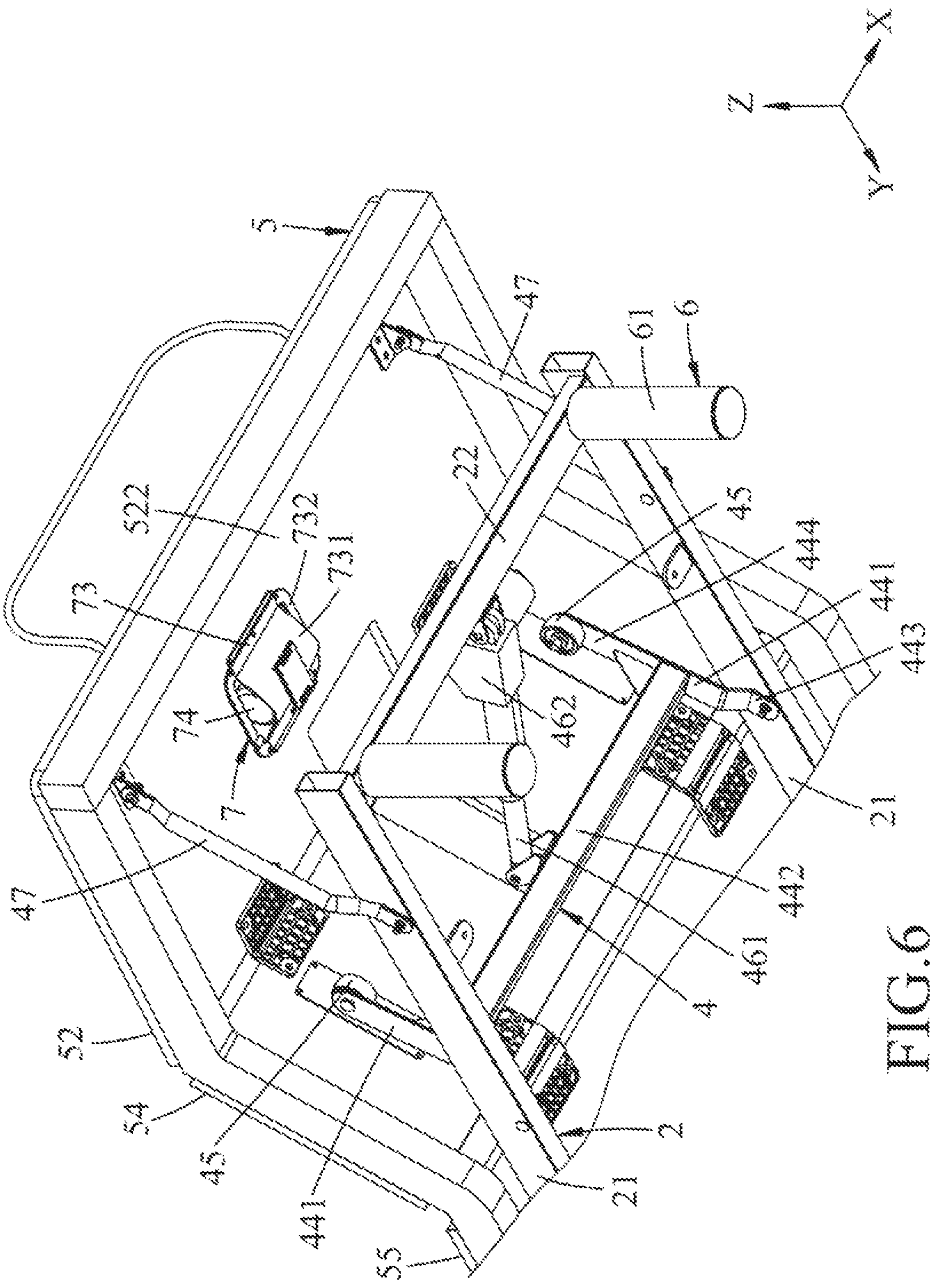
FIG. 6 is a fragmentary perspective view of the second panel, the auxiliary panel, and the second elevating module shown in FIG. 5.
Figure 7:
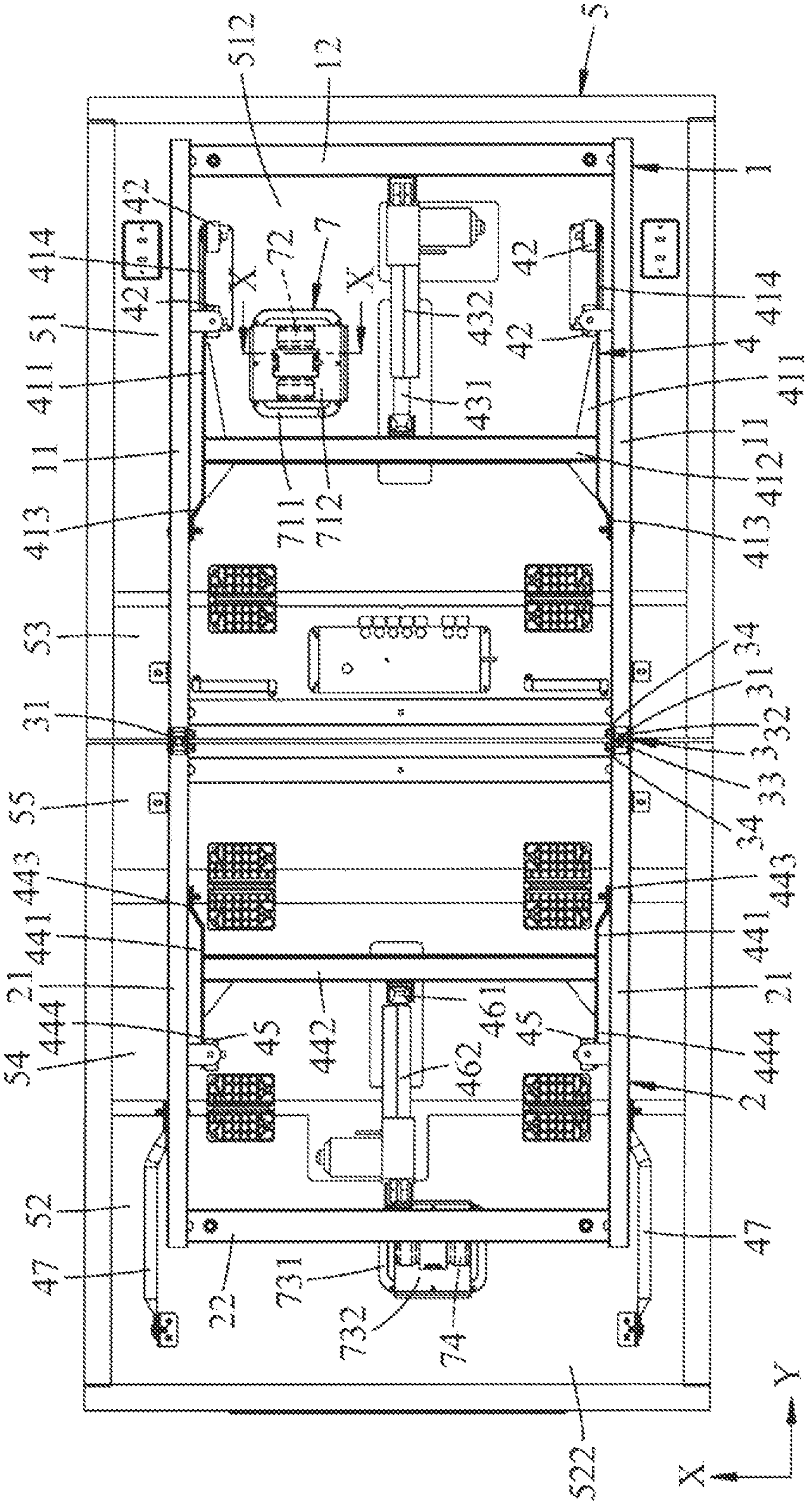
FIG. 7 is a schematic bottom view of the embodiment.

Further referring to FIGS. 5 to 7, the jack unit 4 includes a first movable frame 41, two pairs of first rollers 42, a first elevating module 43, a second movable frame 44, two second rollers 45, and a second elevating module 46.

The first movable frame 41 includes two first swing rods 411 pivotally and respectively connected to inner side surfaces of the first longitudinal frames 11 and a first support rod 412 having two ends interconnects the first swing rods 411. Each of the first swing rods 411 includes a first pivot end 413 pivotally connected to a corresponding one of the first longitudinal frames 11 and a first contact end 414 opposite to the first pivot end 413 along the longitudinal direction (Y) and pivotally connected to a respective one of one pair of the first rollers 42.

The first elevating module 43 is connected to the first frame unit 1 and includes a first telescopic member 431 and a first elevating motor 432. Specifically, the first telescopic member 431 is pivotally connected between the first movable frame 41 and the first transverse frame 12 and is operable to pivot the first movable frame 41 relative to the first frame unit 1. The first elevating motor 432 is connected to and drives the first telescopic member 431 to move.

The second movable frame 44 includes two second swing rods 441 pivotally and respectively connected to inner side surfaces of the second longitudinal frames 21 and a second support rod 442 having two ends interconnects the second swing rods 441. Each of the second swing rods 411 includes a second pivot end 443 pivotally connected to a corresponding one of the second longitudinal frames 21 and a second contact end 444 opposite to the second pivot end 443 along the longitudinal direction (Y) and pivotally connected to a respective one of the second rollers 45.

The second elevating module 46 is connected to the second frame unit 2 and includes a second telescopic member 461, a second elevating motor 462 and two prop rods 47. Specifically, the second telescopic member 461 is pivotally connected between the second movable frame 44 and the second transverse frame 22 and is operable to pivot the second movable frame 44 to move. The second elevating motor 462 is connected to and drives the second telescopic member 451 to move. The prop rods 47 are pivotally and respectively connected to the second longitudinal frames 21.

The bed panel unit 5 includes a first panel 51, a second panel 52, a first fixed panel 53, an auxiliary panel 54, and a second fixed panel 55. The first panel 51 is disposed on the first frame unit 1 and is connected to the first elevating module 43 to be driven to convert between a normal state (FIG. 2), where the first panel 51 is parallel to and overlaid on the first frame unit 1, and an elevated state (FIG. 5), where the first panel 51 is tilted relative to the first frame unit 1. The first panel 51 has a first upper surface 511 and a first lower surface 512 opposite to the first upper surface 511 along the height direction (Z) and in contact with the first, rollers 42, and is formed with a first receiving slot 513 extending through the first upper and lower surfaces 511, 512.

The second panel 52 is disposed on the second frame unit 2, and is connected to the second elevating module 46 to be driven to convert between a normal state (FIG. 2), where the second panel 52 is overlaid on the second frame unit 2, and an elevated state (FIGS. 5 and 6), where the second panel 52 is spaced apart from the second frame unit 2. The second panel 52 has a second upper surface 521 and a second lower surface 522 opposite to the second upper surface 521 along the height direction (Z), and is formed with a second receiving slot 523 extending through the second upper and lower surfaces 521, 522. The prop rods 47 are pivotally connected between the second frame unit 2 and the second panel 52 and are respectively parallel to the second longitudinal frames 21 when the second panel 52 is in the normal state, and are tilted relative to the second longitudinal frames 21 when the second panel 52 is in the elevated state.

The first fixed panel 53 is pivotally connected to the first panel 51 and is connected fixedly to the first longitudinal frames 11. The auxiliary panel 54 is disposed on the second frame unit 2, contacts the second rollers 45, is pivotally connected to the second panel 52, and is connected to the second elevating module 46 to be driven to convert between a normal state (see FIG. 2), where the auxiliary panel 54 is parallel to and overlaid on the second frame unit 2, and an elevated state (see FIG. 5), where the auxiliary panel 54 is tilted relative to the second frame unit 2. The second fixed panel 55 is connected fixedly to the second longitudinal frames 21 and is pivotally connected to the auxiliary panel 54.

The leg unit 6 includes two pairs of frame legs 61 and two hinge legs 62. The two pairs of the frame legs 61 are detachably and respectively connected to the first and second transverse frames 12, 22. Each of the frame legs 61 includes an externally threaded rod portion 611 (see FIG. 5) engaging threadedly a corresponding one of the first and second transverse frames 12, 22.

The hinge legs 62 are respectively and detachably connected to the base walls 312 of the hinge members 31 of the hinge unit 3. Each of the hinge legs 62 includes an externally threaded rod portion 621 extending into and engaging the threaded hole 317 of a respective one of the hinge members 31.

Further referring to FIGS. 6 to 8 and 10, the vibrating unit 7 includes a first connecting set 71, a first motor 72, a second connecting set 73 and a second motor 74. The first connecting set 71 is connected to the first lower surface 512 of the first panel 51 and corresponds in position to the first receiving slot 513. The first motor 72 is connected to the first connecting set 71, has a portion protruding outwardly of the first receiving slot 513, and is spaced apart from a wall of the first panel 51 defining the first receiving slot 513. Similarly, the second connecting set 73 is connected to the second lower surface 522 of the second panel 52 and corresponds in position to the second receiving slot 523. The second motor 74 is connected to the second connecting set 73, has a portion protruding outwardly from the second receiving slot 523, and is spaced apart from a wall of the second panel 52 defining the second receiving slot 523.

In this embodiment, the first connecting set 71 includes a first suspension member 712 that is resilient and that supports the first motor 72 thereon, and a first buckle member 711 that detachably interconnects the first suspension member 712 and the first lower surface 512 of the first panel 51. Similarly, the second connecting set 73 includes a second suspension member 732 that is resilient and that supports the second motor 74 thereon, and a second buckle member 731 that detachably interconnects the second suspension member 732 and the second lower surface 522 of the second panel 52.

The second frame unit 2 is convertible between the normal state and the folded state by pivoting the second frame unit 2 relative to the first frame unit 1. As shown in FIGS. 1 and 4, the first longitudinal frames 111 abut respectively against the second longitudinal frames 22 when the second frame unit 2 is in the normal state.

Figure 9:
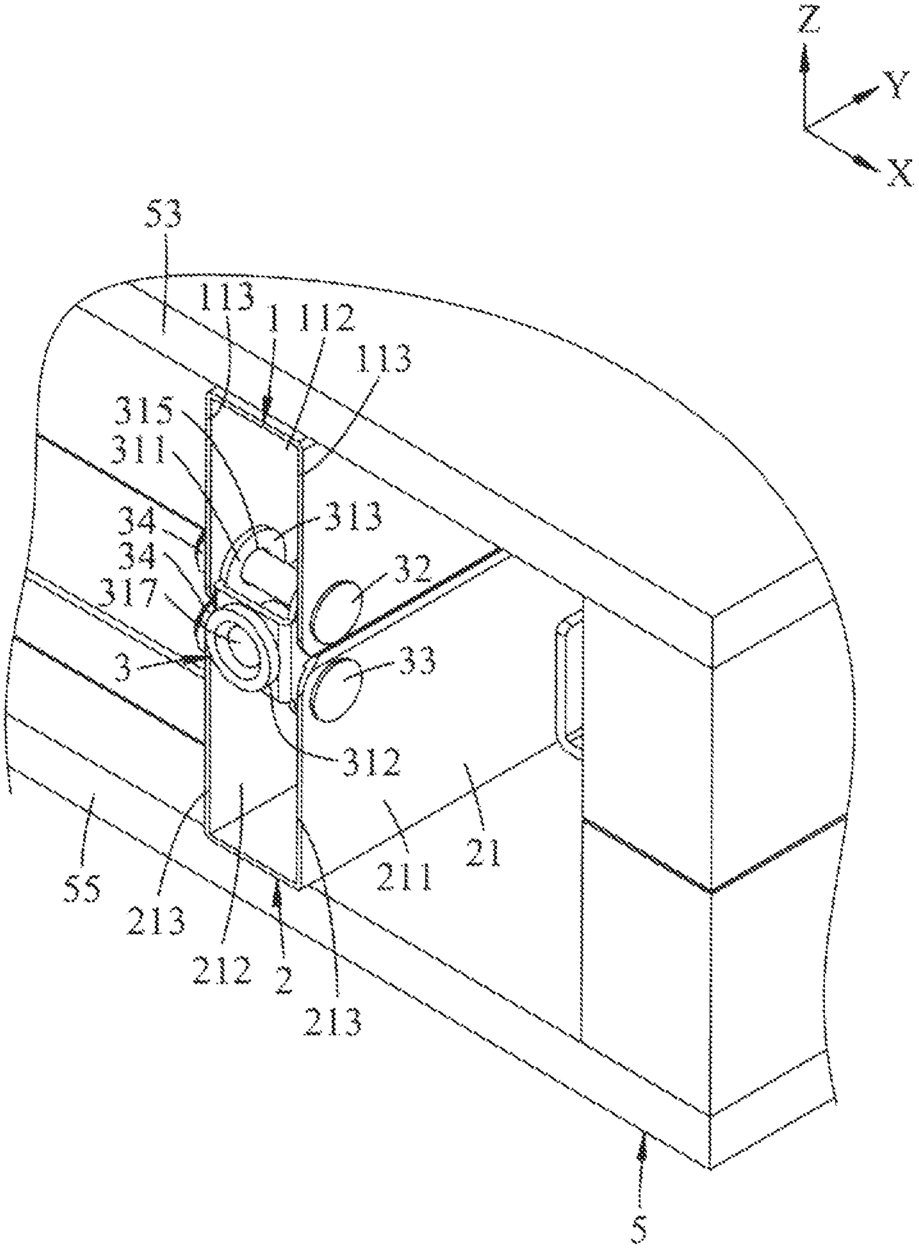
FIG. 9 is a fragmentary perspective view of the embodiment.
Figure 10:
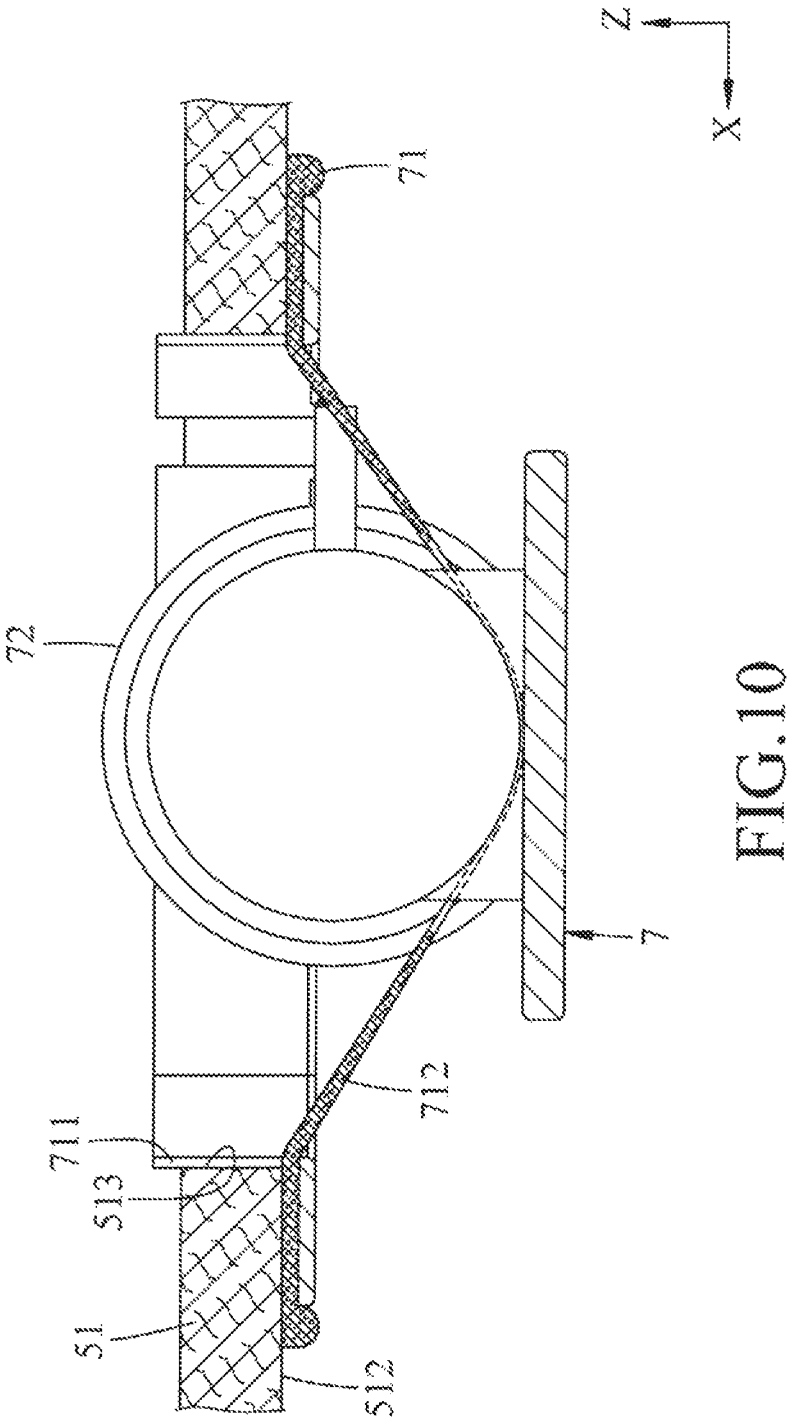
FIG. 10 is a sectional view taken along line X-X in FIG. 7.

In case of the foldable bed assembly is to be transported, the second frame unit 2 is pivoted relative to the first frame unit 1 to convert to the folded state (see FIGS. 8 and 9), where the second longitudinal frames 22 are respectively overlaid on the first longitudinal frames 11 and the first transverse frame 12 is overlaid on the second transverse frame 22. In this way, the foldable bed assembly occupies a relatively small space and can be transported easily.

To adjust a position of the first panel 51 relative to the first frame unit 1, a top end of the first telescopic member 431 is driven by the first elevating motor 432 to move away from the first transverse frame 12 such that the first movable frame 41 pivots relative to the first frame unit 1 and the first rollers 42 that are pivotally connected to the first movable frame 41 and that contact the first lower surface 512 of the first panel 51 move and covert the first panel 51 into the elevated state.

In this state, one side of the first panel 51 is elevated relative to the first frame unit 1 and the first upper surface 511 of the first panel 51 is tilted and can be leaned on by a user's back.

As shown in FIGS. 5 to 7, the second telescopic member 461 is operable to pivot the second movable frame 44 to convert the auxiliary panel 54 between the normal state and the elevated state. Specifically, a top end of the second telescopic member 461 is driven by the second elevating motor 462 to move away from the second transverse frame 22 such that the second movable frame 44 is pivoted relative to the second frame unit 2 and the second rollers 45 that are pivotally connected to the second movable frame 44 and that contact the auxiliary panel 54 move and convert the auxiliary panel 54 into the elevated state. In this state, one side of the auxiliary panel 54 is elevated relative two the second frame unit 2. In this way, the auxiliary panel 54 can be leaned on by a user's thigh and the second panel 52 can be leaned on by a user's calf.

In one embodiment, when a mattress (not shown) is disposed on the bed panel unit 5, the vibrations of the first and second suspension members 712, 732 generated through operation of the first and second motors 72, 74 are transmitted to the bed panel unit 5 so as to massage the user lying on the bed panel unit 5.

To sum up, the advantages of the present disclosure are described in the following. By virtue of the hinge units 3 that interconnect the first and second frame units 1, 2, the second frame unit 2 is pivotable relative to and can be folded on the first frame unit 1 to provide a relatively compact profile. Thus, the foldable bed assembly of the present disclosure can be assembled in advance in the factory before transportation and is converted into the folded state to reduce the difficulty in transportation of the foldable bed assembly. Additionally, the bed panel unit 5 can be moved by the jack unit 4 to cause the first panel 51, the second panel 52 and the auxiliary panel 54 to convert into the elevated state so that the user's leg and back can be rest thereon. Further, the vibrating unit 7 is provided to vibrate and message when the user is lying on the bed panel, unit 5.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. A foldable bed assembly, comprising:

a first frame unit including two first longitudinal frames which extend along a longitudinal direction and each of which has an inner end portion and an outer end portion, and a first transverse frame which extends along a transverse direction transverse to the longitudinal direction and which interconnects said outer end portions of said first longitudinal frames;

a second frame unit including two second longitudinal frames which extend along the longitudinal direction and each of which has an inner end portion adjacent to a respective one of said inner end portions of said first longitudinal frames and an outer end portion, and a second transverse frame which extends along the transverse direction and which interconnects said outer end portions of said second longitudinal frames;

two hinge units pivotally interconnecting said first frame unit and said second frame unit, each of said hinge units being disposed between a respective one of said inner end portions of said first longitudinal frames and a corresponding one of the inner end portions of said second longitudinal frames, and including a hinge member that includes two interconnecting walls spaced apart from each other along the transverse direction and a base wall interconnecting said interconnecting walls, each of said interconnecting walls including a first hinge portion pivotally connected to a corresponding one of said inner end portions of said first longitudinal frames and a second hinge portion pivotally connected to the corresponding one of said inner end portions of said second longitudinal frames; and a leg unit including at least two frame legs that are detachably and respectively connected to said first frame unit and said second frame unit, and two hinge legs that are detachably and respectively connected to said base walls of said hinge members of said hinge units;

said second frame unit being pivotable relative to said first frame unit and convertible between a normal state, where said first transverse frame is spaced apart from said second transverse frame along the longitudinal direction, and a folded state, where said second longitudinal frames are respectively overlaid on said first longitudinal frames and said first transverse frame is overlaid on said second transverse frame;

wherein said inner end portion of each of said first longitudinal frames includes two first pivot connecting walls extending along the longitudinal direction and defining a first receiving groove therebetween, and said inner end portion of each of said second longitudinal frames includes two second pivot connecting walls extending along the longitudinal direction and defining a second receiving groove therebetween, each of said hinge members being entirely disposed in said first receiving groove of a corresponding one of said first longitudinal frames and said second receiving groove of a corresponding one of said second longitudinal frames, and being concealed along the transverse direction by said first pivot connecting walls of the corresponding one of said first longitudinal frames and said second pivot connecting walls of the corresponding one of said second longitudinal frames;

wherein each of said hinge legs has a surrounding wall that surrounds said hinge member of the respective one of said hinge units and that directly abuts against said first pivot connecting walls of said inner end portion of the respective one of said first longitudinal frames and said second pivot connecting walls of said inner end portion of the corresponding one of said second longitudinal frames, such that detachment of said hinge legs from said hinge members of said hinge units permits said second frame unit to move from the normal state to the folded state; and wherein each of said hinge units further includes a first bolt and a second bolt that extend along the transverse direction, said first hinge portion and said second hinge portion of each of said interconnecting walls being respectively formed with first and second pivot holes, said first bolt of each of said hinge units extending through a corresponding one of said inner end portions of said first longitudinal frames and said first pivot holes of said interconnecting walls of a corresponding one of said hinge members so that said first longitudinal frame is pivotable about said first bolt, said second bolt of each of said hinge units extending through a corresponding one of said inner end portions of said second longitudinal frames and said second pivot holes of said interconnecting walls of a corresponding one of said hinge members so that said second longitudinal frame is pivotable about said second bolt, said first longitudinal frames being respectively and pivotally connected to said second longitudinal frames.

2. The foldable bed assembly as claimed in claim 1, wherein said base wall of each of said hinge members is formed with a threaded hole, each of said hinge legs including an externally threaded rod portion extending into and engaging said threaded hole of a respective one of said hinge members.

3. The foldable bed assembly as claimed in claim 1, further comprising a bed panel unit and a jack unit, said bed panel unit including a first panel disposed on said first frame unit, said jack unit including a first elevating module connected to said first frame unit and said first panel and driving said first panel to convert between a normal state, where said first panel is parallel to and overlaid on said first frame unit, and an elevated state, where said first panel is tilted relative to said first frame unit.

4. The foldable bed assembly as claimed in claim 3, wherein said bed panel unit further includes a first fixed panel pivotally connected to said first panel and connected fixedly to said first longitudinal frames, said jack unit further including a first movable frame pivotally connected to said first longitudinal frames and at least two first rollers pivotally connected to said first movable frame and contacting said first panel, said first elevating module including a first telescopic member pivotally connected between said first movable frame and said first transverse frame and operable to pivot said first movable frame relative to said first frame unit to convert said first panel between the elevated state and the normal state.

5. The foldable bed assembly as claimed in claim 3, wherein said bed panel unit further includes a second panel disposed on said second frame unit, said jack unit further including a second elevating module connected to said second frame unit and driving said second panel to convert between a normal state, where said second panel is overlaid on said second frame unit, and an elevated state, where said second panel is spaced apart from said second frame unit.

6. The foldable bed assembly as claimed in claim 5, wherein said bed panel unit further includes an auxiliary panel pivotally connected to said second panel and a second fixed panel connected fixedly to said second longitudinal frames and pivotally connected to said auxiliary panel, said jack unit further including a second movable frame pivotally connected to said second longitudinal frames, and at least two second rollers pivotally connected to said second movable frame and contacting said auxiliary panel, said second elevating module including at least one prop rod pivotally connected between said second frame unit and said second panel, parallel to said second longitudinal frames when said second panel is in the normal state, and tilted relative to said second longitudinal frames when said second panel is in the elevated state, and a second telescopic member pivotally connected between said second movable frame and said second transverse frame and operable to pivot said second movable frame to move said auxiliary panel between a normal state, where said auxiliary panel is parallel to and overlaid on said second frame unit, and an elevated state, where said auxiliary panel is tilted relative to said second frame unit.

7. The foldable bed assembly as claimed in claim 6, wherein said first elevating module further includes a first elevating motor connected to and driving said first telescopic member to move, and said second elevating module further includes a second elevating motor connected to and driving said second telescopic member to move.

8. The foldable bed assembly as claimed in claim 5, further comprising a vibrating unit including a first connecting set and a first motor connected to said first connecting set, said first panel having a first upper surface and a first lower surface opposite to said first upper surface along a height direction transverse to the longitudinal direction and the transverse direction, and formed with a first receiving slot extending through said first upper and lower surfaces and receiving said first motor, said first connecting set being connected to said first lower surface and corresponding in position to said first receiving slot, said first motor having a portion that is exposed outwardly of said first receiving slot and being spaced apart from a wall of said first panel defining said first receiving slot.

9. The foldable bed assembly as claimed in claim 8, wherein said vibrating unit further includes a second connecting module and a second motor connected to said second connecting module, said second panel having a second upper surface and a second lower surface opposite to said second upper surface along the height direction, and formed with a second receiving slot extending through said second upper and lower surfaces and receiving said second motor, said second connecting set being connected to said second lower surface and corresponding in position to said second receiving slot, said second motor having a portion that is exposed outwardly from said second receiving slot and being spaced apart from a wall of said second panel defining said second receiving slot.

* * * * *